Nov. 15, 1949 L. F. McCRADY ET AL 2,487,936
VARIABLE SPEED POWER TRANSMISSION PULLEY UNIT
Filed Nov. 29, 1946 5 Sheets-Sheet 1

INVENTORS
LAWRENCE F. McCRADY
ALBERT W. BARTON
BY *Howard L. Fischer*
ATTORNEY

INVENTORS
LAWRENCE F. McCRADY
ALBERT W. BARTON
ATTORNEY

Nov. 15, 1949     L. F. McCRADY ET AL     2,487,936
VARIABLE SPEED POWER TRANSMISSION PULLEY UNIT
Filed Nov. 29, 1946     5 Sheets-Sheet 3

INVENTORS
LAWRENCE F. McCRADY
ALBERT W. BARTON
BY
ATTORNEY

INVENTORS
LAWRENCE F. McCRADY
ALBERT W. BARTON
BY
ATTORNEY

Nov. 15, 1949     L. F. McCRADY ET AL     2,487,936
VARIABLE SPEED POWER TRANSMISSION PULLEY UNIT
Filed Nov. 29, 1946            5 Sheets-Sheet 5

INVENTORS
LAWRENCE F. McCRADY
ALBERT W. BARTON
BY
ATTORNEY

Patented Nov. 15, 1949

2,487,936

UNITED STATES PATENT OFFICE 2,487,936

VARIABLE SPEED POWER TRANSMISSION PULLEY UNIT

Lawrence F. McCrady and Albert W. Barton, Minneapolis, Minn., assignors to Horton Manufacturing Company, Minneapolis, Minn., a corporation of Minnesota Application November 29, 1946, Serial No. 713,180

10 Claims. (Cl. 192—93)

1

This invention relates to a variable speed power transmission pulley unit comprising a multiple disc governor controlled clutch which is combined with a freely mounted pulley driven by variable friction contact means.

It is a feature to provide a simple construction in compact form with a small number of working parts which normally are positioned within the free pulley which forms an enclosure around the working parts.

A feature resides in mounting the variable speed clutch pulley on a steel hub or sleeve including a set of regulating cam arms which are mounted on the shaft adjacent to the assembly. These cam arms are spring urged in one direction and the free ends are operated by a series of fingers which bear against the free ends of the cam arms to set the variable speed clutch pulley in operation. A yoke is mounted around the shaft and is adapted to provide means of forcing the fingers as a unit against the free ends of the cam arms to operate the variable speed clutch pulley.

A feature resides in providing a variable speed clutch pulley capable of being run at higher speeds than old forms of variable speed pulleys used heretofore and of like horse power. It is also an object to provide small governor weights, which in certain sizes of our pulley are reduced to ounces rather than pounds such as were used heretofore for the governor weights in variable speed clutch pulleys. We have been able to reduce the governor weights owing to the novel method of installation used in our variable speed clutch pulley. Further our pulley eliminates nearly all the fluctuation of speed in a driven machine caused by change of speed of the prime mover.

A further object of our invention resides in providing a variable speed power transmission pulley unit which may be fully assembled to form a single unit and thus shipped to the customer ready to be mounted on the shaft of his machine where he desires a variable clutch pulley of this character.

When our variable speed clutch pulley is mounted on a machine the pulley is belted to a source of power such as an electric motor, or any other source of power, and the pulley runs freely on its bearings until the control lever is operated to bring the friction discs into contact with each side of the freely rotating pulley at a point provided for frictional contact supported by the spokes of the pulley. When the control lever is operated to direct more or less pressure to the friction discs the pulley operates to drive the shaft

2 on which it is mounted at predetermined speeds of rotation.

A further important feature of our variable speed clutch pulley resides in forming the same in segments which provide means of increasing the frictional contact surface by interposing more sections within the pulley. Thus we can increase the area of the frictional contact surfaces in the variable speed clutch pulley to increase the gripping force between the loosely rotatable pulley and the friction discs which are keyed to the hub and in turn which hub is keyed to the shaft to be driven.

Still another feature of our variable speed clutch pulley resides in a sensitive control interposed between the driving motor or power for driving a machine and the main driving shaft of the machine. With our sensitive variable speed clutch pulley, constant speeds may be maintained for any driven machine. According to the setting of the control lever our variable speed clutch pulley provides a new, novel means of transmitting power.

These features, together with other objects and details will be hereinafter more fully defined.

In the drawings forming part of this specification:

Figure 1:
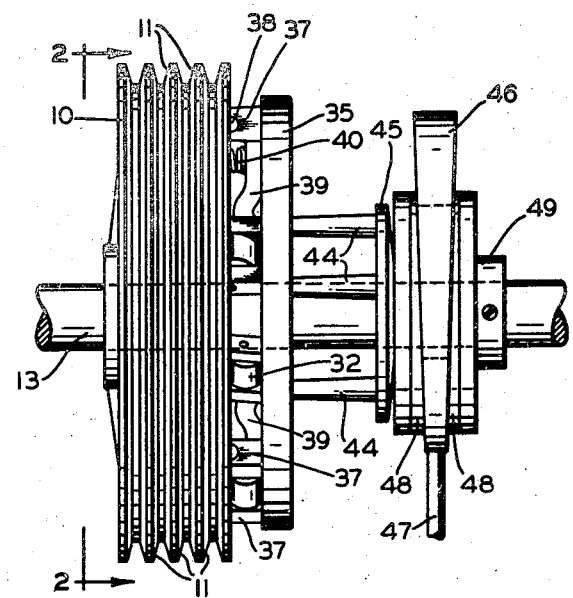
Figure 1 is a plan view looking down on our variable speed clutch pulley unit control mounted on a shaft to be driven by the pulley.

The variable speed clutch pulley consists of the freely mounted pulley 10 having a series of V-grooves 11 formed in the surface of the pulley for V-belt drive means (the belts not being illustrated in the drawing).

The pulley 10 is mounted on a hub 12 which is keyed to the driven shaft 13 by the key 14 and anti-friction bearings 15 support the freely rotatable pulley 10.

The pulley 10 is formed with a series of spokes 16 which support and have integrally formed therewith ring portions 17 on either side of the spokes upon which ring-like friction material 18 is secured. The friction material 18 may be of any suitable material like brake lining to form a long wearing friction surface in ring-like form on either side of the spokes 16 on the pulley 10.

On one side of the spokes and virtually positioned with a rim of the pulley 10, we provide a friction disc 19 which is lined with a ring of friction material (like brake lining) 20. The friction material 20 is adapted to come in contact with the friction material 18 when our variable speed clutch pulley is in operation to drive the shaft 13.

The disc 19 is formed by the ring-like portion which supports the ring of friction material 20 and the series of spokes 21 which connect to the hub 22. The hub 22 is mounted on the sleeve or hub 12 and is held rigidly therewith by means of the set screws.

The variable speed clutch pulley is also provided with a friction disc 25 on the opposite side of the spokes 16 to the friction disc 19. This friction disc 25 is provided with friction material 26 in ring-like form and the ring of the disc 25 which supports this friction material is carried by the spokes 27 which connect with the hub 28. The hub 28 is mounted on the sleeve of hub 12 by the feather key 29 which permits the hub 28 with the friction surface 26 to be moved toward the friction surface 18 mounted on the ring which is supported by the spoke 16.

The disc 25 is formed with a series of projecting lugs 30 between which are mounted on the anti-friction bearing 31 counter weights 32. The counterweights 32 are connected by short belt crank arms 33 to the anti-friction bearing 31 and the arm 33 extends into the short lugs 34, the purpose of which will be hereinafter set forth.

A clutch control assembly disc 35 is mounted on the sleeve or hub 12 and is keyed thereto by the set screw 36. The disc 35 is formed with inwardly projecting lugs 37 which pivotally support at 38 cam arms 39. Each of the cam arms 39 are adapted to support coil springs 40 which extend between the cam arms and the friction disc 25, engaging over the lug 41 on the disc 25 to hold the inner end of the springs 40 in place. Set screws 42 carried by the cam arms 39 adjustably control the outer ends of the coil springs 40 which engage over the lugs 43 and which lugs are operated by the set screws 42.

The free ends of the cam arms 39 are adapted to be engaged by the fingers 44 which are formed in a unit on the disc base 45. A thrust yoke 46 is operated by the pull rod 47 between the thrust bearing discs 48, which discs are held in place around the shaft 13 by the collar 49. When the rod 47 is drawn in a manner to move the thrust yoke 46 against the discs 48, the unit disc 45 with the fingers 44 will move the free ends to the cam arms 39 toward friction disc 25 to move the same against the friction surface 18, also forcing the friction surface 18 on the other side of the spokes 16 against the friction surface 20 of the friction disc 19. This operation causes the freely rotating pulley 10 to be frictionally engaged on either side of its spokes, which in turn causes the rotation of the shaft 13. Increased pressure of the yoke 46 will increase the gripping of the pulley 10 through the friction surface 18, 20 and 26, and in turn rotate the shaft 13 according to the frictional engagement of pulley 10. If the pressure of the yoke 46 is decreased against the finger assembly 44 the friction on the spokes of the pulley through the friction rings will be decreased and the pulley will rotate faster than the shaft 13.

The pulley 10 may be driven by an electric motor or any suitable source of power through V-belts operating in the grooves 11 with a pulley at any predetermined speed and in turn our variable speed clutch pulley may be operated by the yoke 46 to rotate the shaft 13 at a predetermined constant speed. Any variation of speed between the rotation of the pulley 10 and the shaft 13 will be taken care of by the engagement or slipping of the friction surfaces 18, 20 and 26.

When yoke 46 is set to operate the shaft 13 at a given or predetermined speed our variable speed clutch pulley will automatically maintain the rotation of the shaft 13 at the speed desired, controlled by the yoke 46 and by the counterbalancing weights 32 which operate the lugs 34 in the recesses 34'. It will be apparent that when the weights 32 move in the direction of the arrows the lugs 34 will cause the friction disc 25 to be moved away from the friction surface 18 which automatically relieves the friction between the surfaces 18 and 20 on the other side of the spoke 16 and thus permits the pulley 10 to rotate faster, or slip, between the ring-like engaging friction surfaces 20 and 26.

Figure 3:
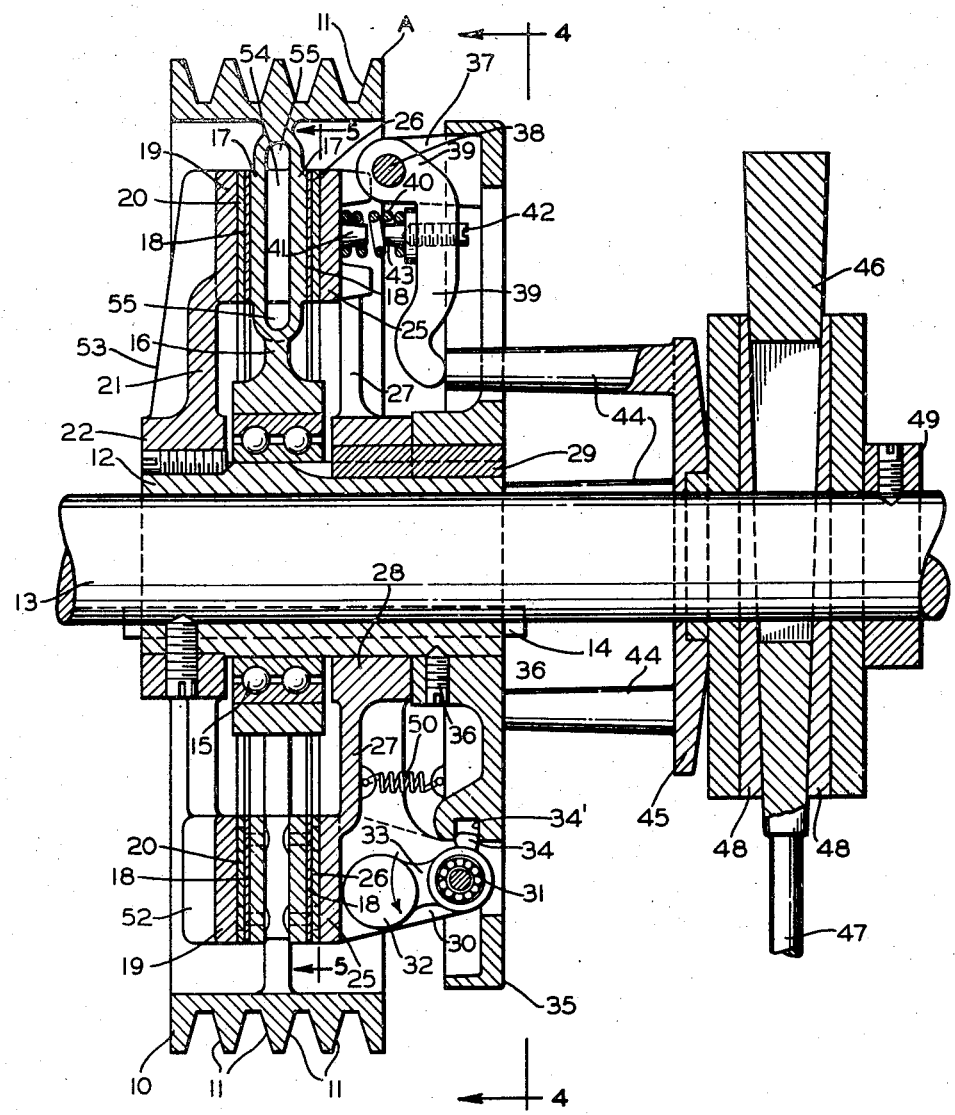
Figure 3 is the section on the line 3—3 of Figure 2.
Figure 4:
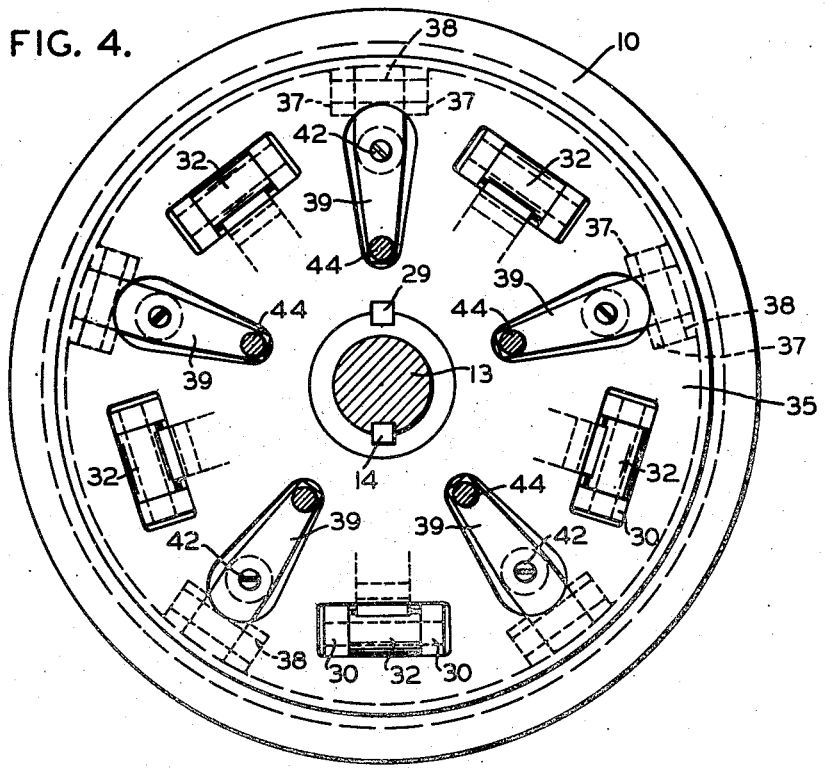
Figure 4 is a view on the line 4—4 of Figure 3 in the direction of the arrows.
Figure 5:
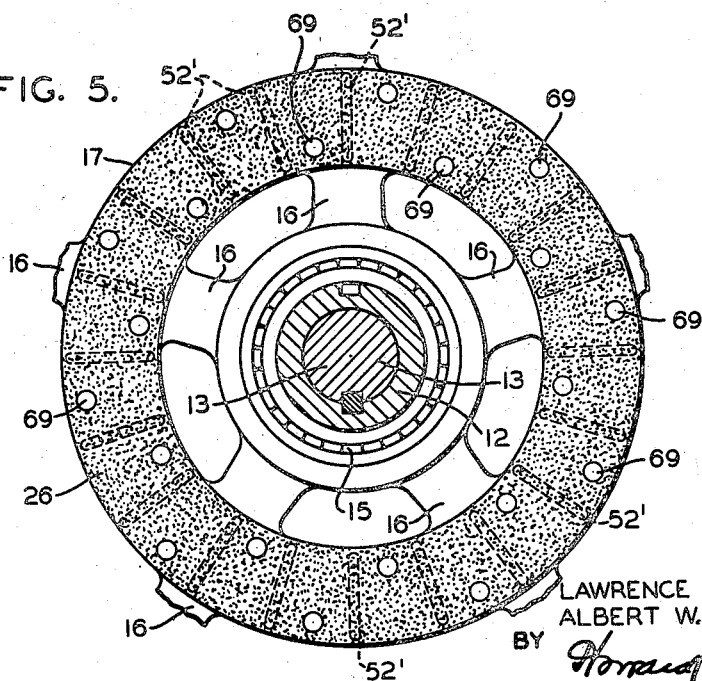
Figure 5 is a section on the line 5—5 of Figure 3 in the direction of the arrow.

To assist the counter weights 32 in relieving the pressure of the friction discs 25 against the spokes of the pulley 10 we provide a series of five, more or less, coil springs 50 which are connected to the spokes 27 and to the assembly disc 35, as illustrated in Figure 3.

Our variable speed clutch pulley 10 is very sensitive and simple. The friction pressure is centralized on the spokes of the pulley 10 and the rim of the pulley 10 virtually conceals the friction discs within the same while the assembly control disc 35 conceals the operating arms 39 and the bearings and counter-balancing weights 32.

Our variable speed clutch is compact and is assembled as a unit on the sleeve or hub 12 so that it can be quickly and freely adapted to any shaft that is desired to be driven at variable speeds, and wherein the control of the speed of the shaft is automatic.

Figure 2:
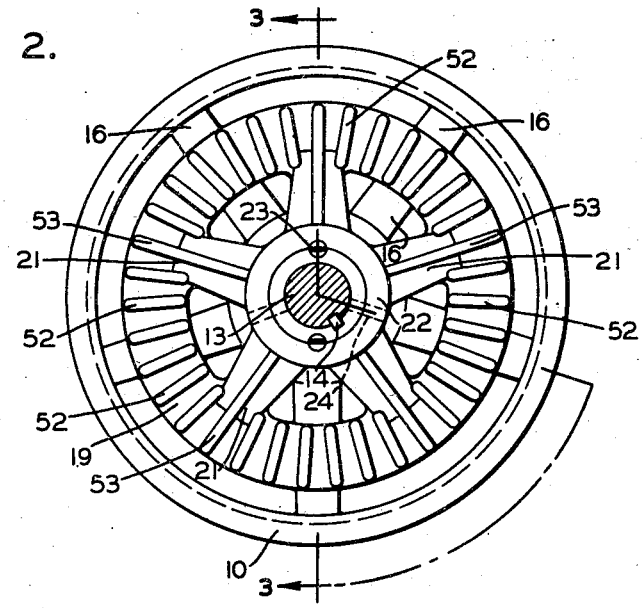
Figure 2 is a view on the line 2—2 of Figure 1 in the direction of arrows.

In the simple form of our variable speed clutch pulley a pair of friction surfaces in ring-like form are provided mounted as an integral part of the spokes 16 and on either side thereof. This simple form of our pulley is shown primarily in Figures 1 to 5 inclusive. We provide short cooling and air ventilating ribs or fins 52 projecting from the outer angular surface of the friction disc 19 as illustrated in Figures 2 and 3 and the long ribs 53 formed on the spokes 21. These ribs project from the friction disc 19 and act as cooling fins to circulate air over the spokes 16 of the pulley 10. As a further cooling means for the spokes 16 of the pulley 10, we provide a hollow space 54 in each of the spokes 16 which extend between the outer rim in which the V-grooves are formed and the inner hub of the pulley 10. The space 54 opens at its ends 55 to the outer atmosphere to permit the circulation of air through the space 54 as illustrated in Figure 3.

Thus in the simple form of our variable speed clutch pulley one frictional section is provided which includes one set of spokes 16 which carry the friction supporting surfaces 17 and the discs 19 and 25. If a larger variable speed clutch is desired more sections may be added so as to provide a greater friction area within the pulley.

Figure 6:
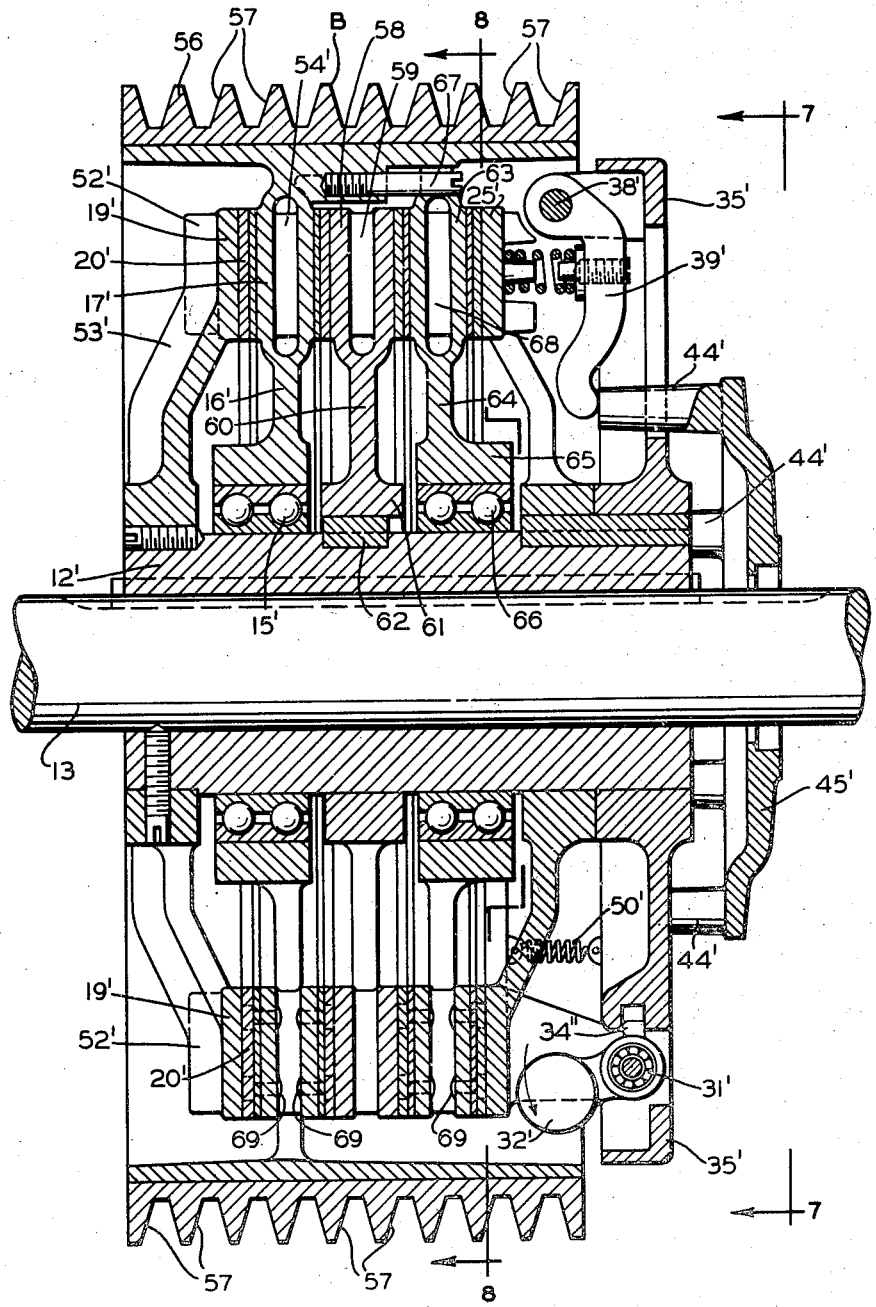
Figure 6 is a section on the line 6—6 of Figure 7, showing an alternative construction.
Figure 7:
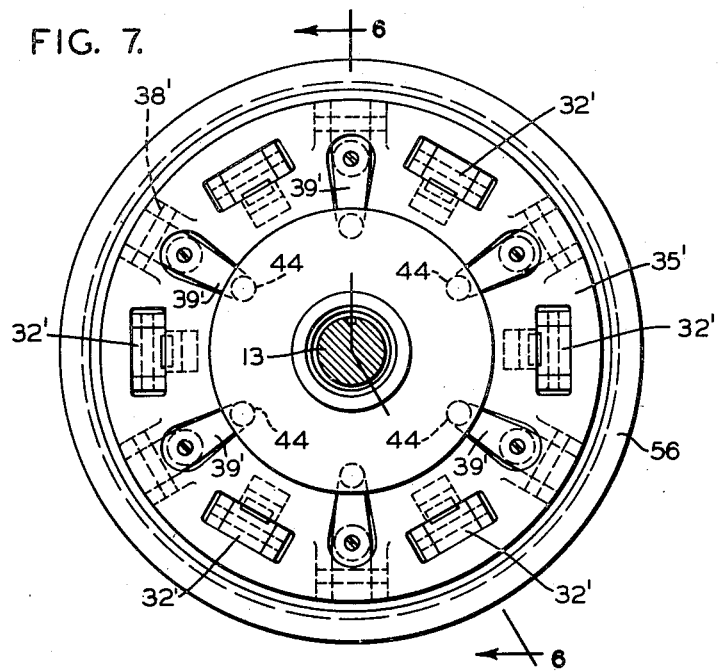
Figure 7 is a view on the line 7—7 of Figure 6.
Figure 8:
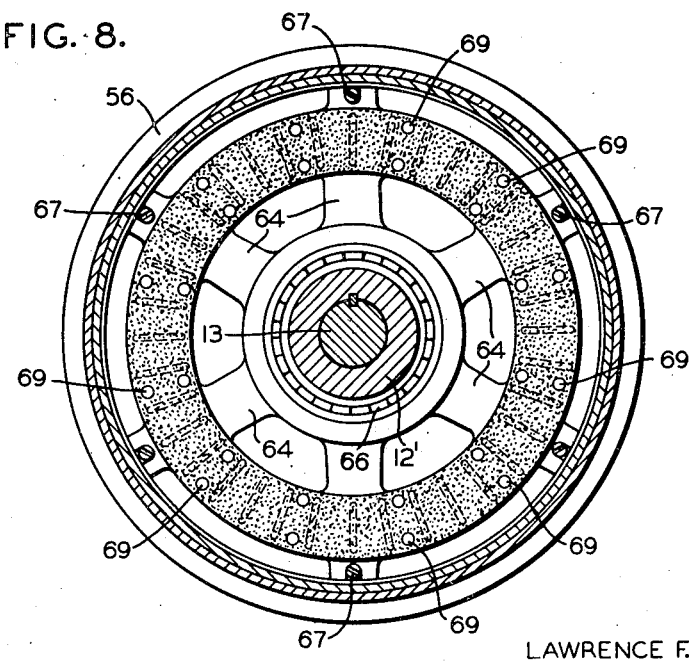
Figure 8 is a section on the line 8—8 of Figure 6.

We have illustrated in the Figures 6, 7 and 8 a form of our variable speed clutch pulley with several sections of frictional units connected together to increase the area of the friction surfaces in the variable speed clutch pulley 56. The pulley 56 is virtually identical to the pulley 10 excepting that it has a larger belt surface formed with the V-grooves 57 for the V-belts and in this way increases the size of our variable speed clutch pulley. We provide main spokes 16' which spokes support the pulley 56 on the anti-friction bearing 15'. The whole pulley unit illustrated in Figure 6 is supported on the sleeve bushing 12' which is keyed to the shaft 13 in the same manner as the pulley 10 is secured.

The pulley 56 is provided with the friction disc 19' which supports the friction material 20'.

The friction disc 19' is adapted to bear against one side of the spokes 16' which are formed with the friction supporting ring 17'. Within the rim of the pulley 56 we provide auxiliary sections which are adapted to support additional friction rings. The center of these auxiliary sections is formed by the friction ring 58 which is provided with the air space 59 in the outer ends of the spokes 60 which support the friction ring 58 to the hub 61. The hub 61 is secured by a feather key 62 to the sleeve 12'. Thus the friction ring 58 is mounted slidably so that it can be forced against the inner friction surface of the spokes 16'.

A further sectional unit is provided within the pulley 56 by the auxiliary friction disc 63. This friction disc 63 is provided with a pair of ring-like friction surfaces on either side of the spokes 64 thereof. The friction disc 63 is complemental to the friction disc 25 in the simple form of our variable speed clutch pulley and the spokes 64 connect with the hub 65 which is mounted on the anti-friction bearing 66 so that the friction disc 63 may rotate freely on the sleeve 12'. The outer free ends of the spokes 64 are connected by the screw lugs 67 to the outer ends of the spoke 16' which are integrally formed with the rim of the pulley 56. Thus the friction disc 63 is connected within the rim of the pulley 56 in a manner so that it can be assembled with the friction disc 58 between the same and so that these members may be removed and replaced whenever desired. This construction also permits the friction surfaces to be relined when they become worn.

The spokes 64 are also provided with air ventilated spaces 68 which are similar to the air ventilating spaces 54, 59 and the air ventilating space 54' formed in the spoke 16'.

The friction material 18 and 20 may be secured by suitable rivets 69 or other suitable means just the same as brake lining is secured to automobile brakeshoes.

A further frictional disc unit 25' is provided which is adapted to bear against the friction disc 63 in the operation of the pulley 56 in the same manner as the friction disc 25 bears against the friction surface on the spoke 16. We provided a clutch control assembly disc 35' for the pulley 56 which in all respects is the same as the clutch control assembly discs 35 of the pulley shown in Figure 3. This control assembly is adapted to support the cam arms 39' pivoted at 38' which are adapted to be operated on their free ends by the fingers 44'.

Furthermore, we provide a series of counterweights 32' mounted on antifriction bearings 31' and which are formed with the operating lugs 34" which counterweights 32' operate to relieve the clutching action of the friction disc in the pulley 56 when the pulley rotates to operate the shaft 13 at a greater speed than is desired. Thus the pulley 56 may be operated to provide a variable speed clutch pulley to operate the speed of the shaft 13. The counterweights 32' automatically operate to release the frictional engagement of the friction discs within the pulley 56.

The fingers 44' are formed in the assembly unit with the disc base 45' which is adapted to be operated by a yoke member as shown in Figure 3 similar to the yoke 46 with the bearing surfaces 48 and the fixed collar 49.

The pulley assembly 56 illustrates the manner in which a series of auxiliary friction discs such as 58 and 63 may be provided to increase the area of friction surface within the pulley 56. In this manner we are able to provide a variable speed clutch pulley having greater strength and increased frictional contact surface which may be connected to a powerful driving force or motor and yet which is extremely sensitive in operation to relieve the friction automatically within the pulley 56 and to maintain the constant predetermined speed of operation of shaft 13.

We have increased the number of spokes in the pulley unit 56 and proportionally we have increased the number of counterweights 32' and the relief springs 50'.

Cooling fans or ribs 52' and 53' are provided for the friction disc 19'.

Thus we have provided a sectional variable speed clutch pulley which may be in a simple form as illustrated in Figure 3 or may be built up into a larger and stronger form as illustrated in Figure 6 with a number of sectional units operating together to provide a variable speed clutch pulley of an extremely simple construction and maintaining a sensitive operation so that the clutch pulley will instantly respond to changes in speed or power and thus maintain a constant R. P. M. to the driven shaft 13. A clutch pulley of this nature is highly desirable in the operation of machines such as paper winding machines and other machines where the driven power shaft must be maintained at a constant predetermined speed of rotation. With our variable speed clutch pulley, we accomplish these results in a positive manner. Our clutch pulley is extremely compact and the parts are virtually concealed within the rim of the pulley.

A further feature resides in providing means of varying the speed of the clutch pulley while it is operating the shaft 13 so that the speed of the shaft 13 may be varied without stopping the clutch pulley. This is accomplished by means of the control lever 47 which operates the yoke 46 and regulates the cam levers of the clutch control disc 35 during the rotation of the pulley 10 or 56. The pulley 10 or 56 may be connected with any source of power and may continue to rotate while the control lever 47 is operated and set in the desired operating position (by means not illustrated in the drawing) to maintain the R. P. M. of the driven shaft 13 or to vary it without shutting off the power to the pulley wheel.

Our variable speed clutch pulley is designed to rotate the driven shaft 13 from zero R. P. M. up to the top belt speed source of power operating the pulley.

In our variable speed power transmission pulley unit the assembly control disc 35 which is mounted on the sleeve 12 and which disc carries the operating arms 39 with the spring adjusting screws 42 extending through the arms 39 to permit the tension on the springs 40 to be adjusted. This provides a delicate adjustment for the power transmission pulley unit A. Thus we provide a means of adjusting the spring tension against the friction disc 25 to make the operation thereof very sensitive.

The springs 50 tend to normally hold the friction disc 25 away from the friction surface 18 on the inside of the pulley 10 and thus the pulley 10 is adapted to run free on the ball bearing 15 with the belt (not shown) from a motor or source of power engaging in the V-grooves 11. Thus in the start of the operation of the pulley unit A the source of power will rotate the loose pulley without any load and the pulley will continue to rotate freely on the bearing 15 until the fingers 44 are moved inwardly against the free ends of the levers 39 to start the pulley unit A to drive the shaft 13 which in turn will operate the machine adapted to be operated by the driven shaft 13. Thus to start the machine operated by the pulley unit A, the yoke 46 is operated to force the fingers 44 gradually against the free ends of the levers 39. This causes the springs 40 to force the sliding parts, in the transmission pulley unit together creating friction between the friction faces of the pulley unit and the friction discs, namely 19 and 25.

When the complete unit A begins to turn with the loose pulley 10, the small governor weights 32 swing outwardly and this action tends to remove the pressure on the friction faces, allowing them to slip, and if the pressure exerted by the expand yoke 46 is gradually increased it will eventually cause the shaft 13 to turn out the belt speed on the pulley 10; or if the increase in the pressure is stopped at a point before the belt speed is attained, the increase in the speed will stop and the shaft 13 will continue to rotate at some intermediate speed. This speed can be increased by the expanding movement of the yoke 46, slightly, or it may be decreased by moving the yoke 46 to permit the levers 39 to expand against the action of the spring 40 and the springs 50 until the desired speed is attained.

The small weights 32 act to automatically maintain any set intermediate speed in the same manner as a governor operated by centrifugal force. Thus the small governor weights 32 tend to maintain any set speed in accordance with the set of the fingers 44 by the cam yoke 46.

The set screw secured through the hub 12 and into a recess in the shaft 13 holds the unit from sliding longitudinally on the shaft 13, while a key 14 holds the unit keyed thereto.

Greater friction area may be obtained in the pulley unit B, as hereinbefore set forth.

Further advantages of our variable speed power transmission unit are easy installation, smooth, easy starting, gradual slow or quick acceleration or deceleration, a safety device and the ease in which any change of speed may be accomplished. The pulley unit requires very little, if any, attention or lubrication. All adjustments are easily made without dismantling the unit and while the unit is in operation.

We claim:

1. A variable speed clutch pulley including a freely rotatable pulley, a sleeve bushing upon which said pulley rotates, means for securing said bushing to a shaft to be driven, a pair of friction surfaces formed on either side of the web spokes of said pulley, a fixed friction disc mounted on said sleeve bushing on one side of the web spokes of said pulley and having frictional contact means for engagement with the frictional surfaces on said web spokes, a slidably mounted friction disc supported on said sleeve bushing and rotatable therewith adapted to engage the other side of said web spokes of said pulley, an assembly control disc keyed to said bushing adjacent said slideably mounted disc, a series of cams pivoted to said assembly disc, adjustable spring means connecting said cams to said slideably mounted disc, finger means for actuating the free ends of said cams and means for automatically relieving the frictional contact of said frictional disc control by centrifugal force to allow said pulley to slip between said friction discs to govern the speed of rotation of the driven shaft on which said variable speed clutch pulley is mounted.

2. A variable speed clutch pulley assembly unit comprising a freely rotatable pulley having V-grooves in the outer surface thereof, a sleeve bushing upon which said pulley is mounted to rotate freely, a pair of friction discs mounted on said sleeve bushing, one of which is keyed and fixed to said bushing, the other of which is feather-keyed and slidable on said bushing, means securing said bushing sleeve to a shaft to be driven, means for regulating the frictional engagement of said discs by pressure against said friction disc which is feather-keyed to said bushing and a series of counterweights carried by said slideable friction disc adapted to automatically relieve the friction pressure against either side of said pulley, whereby said variable speed clutch pulley may be operated by a source of power and may automatically slip between said friction discs to maintain a constant predetermined speed of rotation to said shaft on which said pulley is mounted.

3. A variable speed clutch pulley comprising a freely mounted pulley driven by an outside source of power, said pulley rotating upon a sleeve, said sleeve keyed to a shaft, spokes supporting the rim of said pulley, said spokes supporting ring-like friction discs, similar friction discs adaptably mounted to engage said ring-like discs mounted on said spokes, the surfaces of said discs adapted to be brought into contact by cam means, said cam means including an assembly disc mounted on said sleeve adjacent said freely mounted pulley, a series of cams pivotally supported on said disc, finger means for actuating said cams to bring said friction discs into engagement with each other, said finger means actuated by means adapted to operate said finger means, counterweights adapted to maintain a constant speed of said shaft whereby said shaft may be caused to rotate at any speed equal to or less than the speed of the freely mounted driven pulley.

4. A variable speed clutch pulley unit, comprising a freely rotatable pulley adapted to be driven by a source of power, a bushing sleeve adapted to support said pulley freely rotatable thereon, means keying said bushing to a shaft to be driven, frictional surfaces formed within said pulley, friction discs mounted within the rim of said pulley on said bushing, means for fixing one of said friction discs to said bushing, means for slidably supporting and feather-keying the other of said friction discs to said bushing, an assembly disc mounted on said bushing, a series of cam arms pivotally mounted on said assembly disc, resilient means connecting said cam arms to contact the inner of said discs, finger means for forcing said cam arms to move said pully to press said pulley between said friction discs and thereby causing said pulley to drive the shaft on which said pulley is mounted and means for relieving the frictional gripping of said pulley by said discs by centrifugal force whereby said pulley will operate the driven shaft at a predetermined speed.

5. A variable speed clutch unit, a bushing sleeve upon which said unit is mounted, a shaft adapted to be driven by said unit, means for keying said bushing to said shaft, means for mounting said pulley freely rotatable on said bushing sleeve, a friction disc positioned within one end of said pulley and keyed to said bushing sleeve, a second friction disc feather-keyed to said bushing sleeve and positioned within the other end of said pulley, means for moving said second friction disc into engagement with said freely rotatable pulley to force it into engagement with said first friction disc causing said pulley to be gripped between said friction disc in a manner to rotate said shaft counterweights carried by said moveable second friction disc, adapted to cause said pulley to slip between said friction discs and thereby reduce the speed of rotation of said driven shaft and thereby drive said driven shaft at a predetermined speed of rotation.

6. A variable and constant speed clutch pulley, comprising a freely rotatable pulley adapted to be driven by a source of power, said pulley having a series of spokes, a friction disc mounted on the inner side of said spokes, a friction disc mounted on the outer side of said spokes, friction material attached to said discs, a sleeve secured to a shaft, said pulley rotating on said sleeve and longitudinally slidable thereon, a hub secured on the outer end of said sleeve, a series of spokes fixed to said hub and supporting a friction disc in line with the outer of said discs on said pulley spokes, friction material attached to said disc, a hub slidably secured adjacent the inner end of said sleeve supporting a series of spokes, a friction disc supported by said spokes of said hub adjacent said inner end of said sleeve and positioned opposite the said inner disc of said pulley spokes, an assembly disc secured on the inner end of said sleeve, said assembly disc formed with a series of inwardly projecting lugs, a series of cam arms pivotly supported on said lugs, a series of coil springs adaptably supported by said cam arms to urge said cam arms away from said discs, means to maintain a constant speed of said driven shaft, a series of fingers mounted on a disc base, said fingers contacting the ends of said cam arms, thrust bearing discs positioned adjacent said disc base on said shaft, a thrust yoke adapted to separate said bearing discs and actuate said disc base by said fingers whereby said fingers move said cam arms inwardly against the action of said coil springs causing said friction discs to contact and operate said driven shaft at variable speeds.

7. A variable speed power transmission pulley unit comprising a loose pulley freely rotatable, a sleeve for supporting said pulley unit, means fixing said sleeve against longitudinal and rotary movement on a shaft adapted to be driven by said unit, a friction disc within one end of said pulley keyed to said sleeve, friction surfaces formed on either side of said pulley within the rim of the same, a friction disc in the other end of said pulley, means slidably keying said last friction disc to said sleeve, a fixed assembly disc keyed to said sleeve adjacent said slidable friction disc, a series of cam levers pivoted to said assembly disc, adjustable coil springs extending between said levers and said slidable friction disc to press said slidable friction disc against said friction surface on said pulley, and in turn press said pulley against said first fixed friction disc and counterweights carried by said slidable friction disc and having a crank arm engaging said fixed disc assembly adapted to automatically govern the operation of said pulley unit by maintaining a constant predetermined speed of rotation for the driven shaft supporting said unit in accordance with the predetermined setting of said cam levers whereby to permit the slipping of said freely rotatable pulley between said friction surfaces to maintain the constant speed of the driven shaft.

8. A variable speed power transmission pulley unit comprising a sleeve for supporting said unit on a shaft adapted to be driven by said unit, said unit including a freely rotatable pulley, a ball-bearing means for mounting said pulley on said sleeve, a fixed friction disc secured to said sleeve and against which spokes of said freely rotatable pulley are adapted to frictionally engage a pair of auxiliary friction discs positioned on the opposite side of the spokes of said freely mounted pulley to said friction discs, the intermediate auxiliary friction discs being slidably keyed to said sleeve and the outer auxiliary friction disc beng supported on the ball bearings to rotate on said sleeve and slide toward said intermediate friction disc, key rods connecting said outer auxiliary friction disc with said freely rotatable pulley to cause the same to rotate freely with said pulley when the friction surfaces in said unit are out of engagement with each other, an outer friction disc slidably mounted on said sleeve to engage against said outer auxiliary frictional disc, means supported by said sleeve adapted to adjustably force said outer slidable friction disc against the outer auxiliary friction disc to slide the same against said intermediate friction disc causing it to slide into engagement with the inner friction surface of the spokes of said loose pulley and causing said loose pulley to move into engagement with said first friction disc, to cause said loose pulley to be frictionally engaged in a manner to drive the shaft supporting the same and means operated by centrifugal force for relieving the frictional engagement of all of said friction surfaces to slip said freely rotatable pulley and auxiliary friction disc to vary the speed of rotation of the driven shaft.

9. A variable speed clutch pulley unit including a shaft, a sleeve bushing secured to said shaft, a pulley rotatable and slideable longitudinally on said bushing, an outer friction disc secured to the outer end of said bushing adjacent said pulley, an inner friction disc slideably mounted on said bushing adjacent said pulley, friction discs formed on both sides of the spokes of said pulley, an assembly control disc secured to said bushing, counterweights pivotally supported on said inner friction disc adapted to act against said assembly disc to relieve the gripping force of said friction discs, a series of cam arms mounted on said assembly disc adapted to contact said inner friction disc, moveable finger means for actuating said cam arms to move said friction discs into engagement with each other to drive said shaft at a predetermined constant speed.

10. A variable speed power transmission unit including a shaft, a sleeve bushing secured to said shaft, a pulley rotatable and slideable longitudinally on said bushing, an outer friction disc secured to the outer end of said bushing adjacent said pulley, an inner friction disc slideably mounted on said bushing adjacent the other side of said pulley, friction surfaces formed on both sides of the spokes of said pulley, an assembly control disc secured to said bushing, a series of recesses formed in said control disc, a series of projecting lugs formed on said inner friction disc, a series of counterweights pivoted to said projecting lugs, lugs formed on the base of said pivoted counterweights adapted to engage with said recesses of said control disc whereby when said counterweights move outwardly due to centrifugal force said lugs engage said recesses to draw said inner friction disc away from the friction surface formed on said pulley spokes.

LAWRENCE F. McCRADY.
ALBERT W. BARTON.

REFERENCES CITED

The following references are of record in the file of this patent:

UNITED STATES PATENTS

| Number | Name | Date |
|---|---|---|
| 453,033 | Blount | May 26, 1891 |
| 773,370 | Brown | Oct. 25, 1904 |
| 1,599,343 | Newdick | Sept. 7, 1926 |
| 1,662,598 | Bierman | Mar. 13, 1928 |
| 1,963,277 | Pearman | June 19, 1934 |
| 2,197,522 | Ferguson et al. | Apr. 16, 1940 |
| 2,207,051 | Colman | July 9, 1940 |
| 2,429,837 | Merline | Oct. 28, 1947 |
| 2,446,703 | Honigman | Aug. 10, 1948 |